(12) United States Patent
Kim et al.

(10) Patent No.: US 9,554,021 B2
(45) Date of Patent: Jan. 24, 2017

(54) METHOD AND APPARATUS FOR RECEIVING VIDEO SIGNAL

(71) Applicant: NEXTCHIP CO., LTD., Seongnam-si (KR)

(72) Inventors: Do Kyun Kim, Seoul (KR); Il Gwon Kim, Guri-si (KR); Jin Gun Song, Seoul (KR)

(73) Assignee: NEXTCHIP CO., LTD., Seongnam-si (KR)

( * ) Notice: Subject to any disclaimer, the term of this patent is extended or adjusted under 35 U.S.C. 154(b) by 0 days.

(21) Appl. No.: 15/031,602

(22) PCT Filed: Feb. 27, 2015

(86) PCT No.: PCT/KR2015/001910
§ 371 (c)(1),
(2) Date: Apr. 22, 2016

(87) PCT Pub. No.: WO2016/098945
PCT Pub. Date: Jun. 23, 2016

(65) Prior Publication Data
US 2016/0344904 A1    Nov. 24, 2016

(30) Foreign Application Priority Data

Dec. 17, 2014   (KR) .................. 10-2014-0182370

(51) Int. Cl.
*H04N 5/21*     (2006.01)
*H04N 5/205*    (2006.01)
*H04N 5/04*     (2006.01)

(52) U.S. Cl.
CPC .................. *H04N 5/21* (2013.01); *H04N 5/04* (2013.01); *H04N 5/205* (2013.01)

(58) Field of Classification Search
CPC ............ H04N 5/21; H04N 5/04; H04N 5/204; H04N 9/77; H04N 9/78; H04N 9/45; H04N 9/475; H04N 9/455; H04N 19/00533; H04N 19/00939; H04N 5/40
(Continued)

(56) References Cited

U.S. PATENT DOCUMENTS 5,808,701 A * 9/1998 Lee .......................... H04N 9/77
                                                348/663
6,765,624 B1 * 7/2004 Voltz ...................... H04N 9/455
                                                348/506
(Continued)

FOREIGN PATENT DOCUMENTS

CN      101257570 A      9/2008
CN      102724519 A     10/2012
(Continued)

OTHER PUBLICATIONS

PCT International Search Report, PCT/KR2015/001910, dated Jul. 8, 2015, 3 pages.
(Continued)

*Primary Examiner* — Trang U Tran
(74) *Attorney, Agent, or Firm* — Daly, Crowley, Mofford & Durkee, LLP

(57) ABSTRACT

An analog video signal received through a cable may be distorted due to the cable and noise during its transmission. Provided is a method and apparatus for determining a level of transmission distortion and compensating for an analog video signal. A video signal reception method and apparatus may determine a distortion level of an analog video signal using an equalizing pattern signal included in a video signal, and may compensate for the analog video signal based on the distortion level.

15 Claims, 13 Drawing Sheets

(58) Field of Classification Search
USPC ............... 348/625, 663, 521, 524, 571, 572
See application file for complete search history.

(56) References Cited

U.S. PATENT DOCUMENTS

| | | | |
|---|---|---|---|
| 7,701,512 B1* | 4/2010 | Woodall | G09G 5/12 |
| | | | 348/526 |
| 7,710,500 B2* | 5/2010 | Byeon | H04N 9/44 |
| | | | 348/521 |
| 2003/0095190 A1 | 5/2003 | Mizutani et al. | |
| 2009/0027553 A1* | 1/2009 | Park | H04N 9/68 |
| | | | 348/528 |
| 2013/0271658 A1* | 10/2013 | Mombers | H04N 5/06 |
| | | | 348/550 |
| 2014/0328409 A1* | 11/2014 | Hwang | H04N 9/44 |
| | | | 375/240.25 |
| 2015/0077631 A1* | 3/2015 | Yin | H04N 11/002 |
| | | | 348/441 |

FOREIGN PATENT DOCUMENTS

| | | |
|---|---|---|
| CN | 103918254 A | 7/2014 |
| KR | 20020092601 A | 12/2002 |
| KR | 10-2006-0108422 | 10/2006 |
| KR | 20140065109 A | 5/2014 |
| KR | 101440260 B1 | 9/2014 |
| KR | 101460480 B1 | 11/2014 |

OTHER PUBLICATIONS

Written Opinion, PCT/KR2015/001910, dated Jul. 8, 2015, 6 pages.
Korean Notice of Allowance dated Jul. 15, 2015, Application No. 9-5-2015-047407318, 5 pages.
Korean Office Action dated May 19, 2015, Application No. 9-5-2015-032930212, 5 pages.
Chinese Office Action dated Apr. 12, 2016, Application No. 201510232310.0, 5 pages.

* cited by examiner

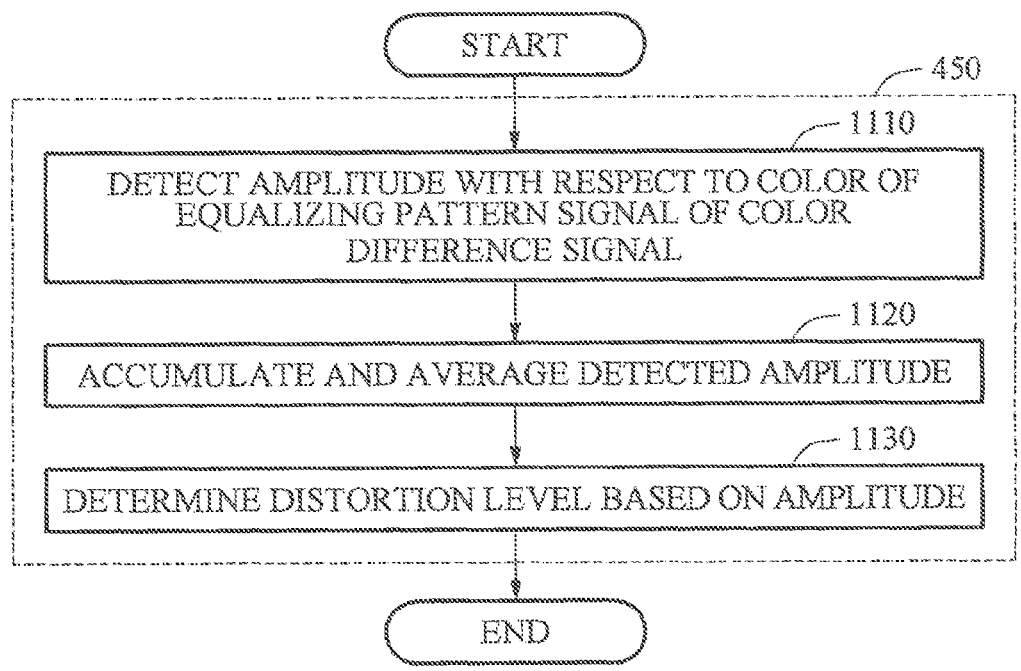
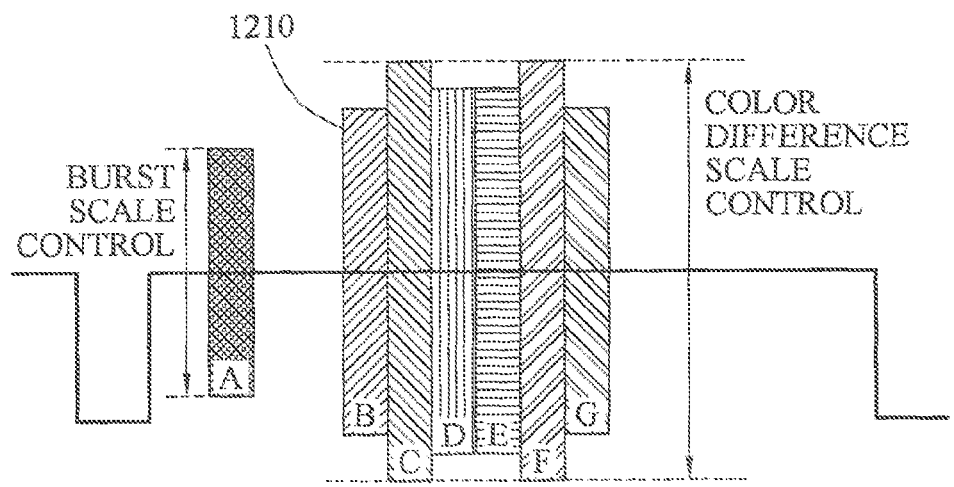

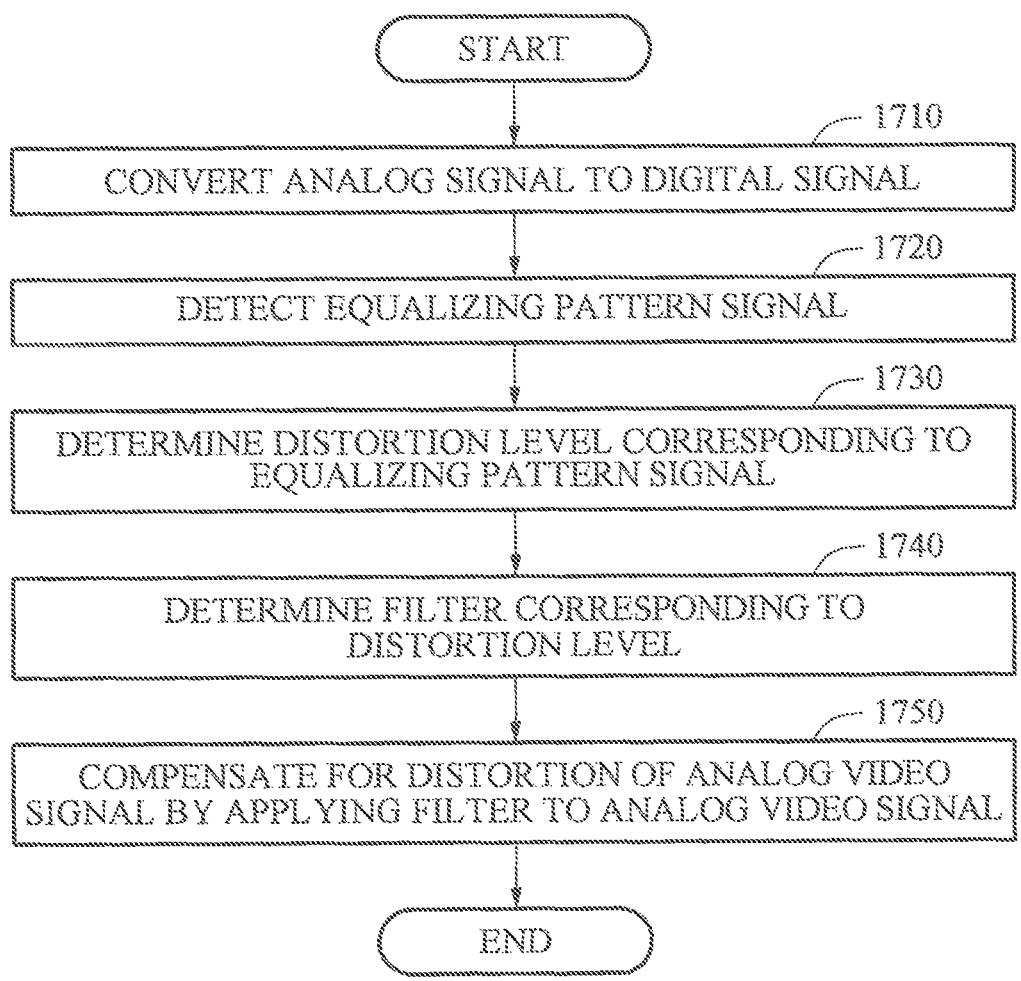

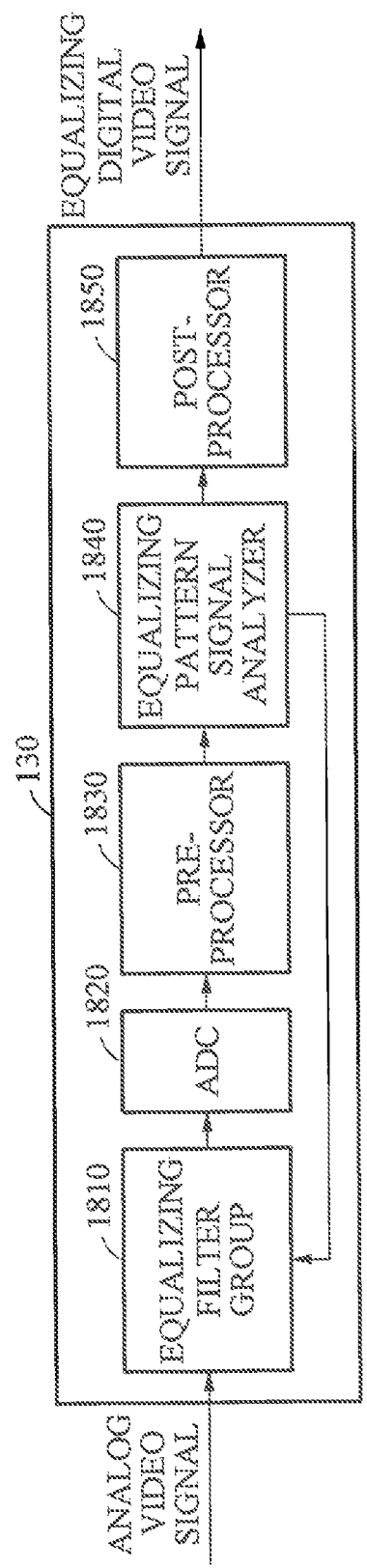

METHOD AND APPARATUS FOR RECEIVING VIDEO SIGNAL

CROSS REFERENCE TO RELATED APPLICATIONS

This application is a U.S. National Stage of PCT application PCT/KR2015/001910 filed in the Korean language on Feb. 27, 2015, and entitled "METHOD AND APPARATUS FOR RECEIVING VIDEO SIGNAL," which claims priority to Korean application KR 10-2014-0182370, filed Dec. 17, 2014 which applications are each hereby incorporated herein by reference in their entireties.

TECHNICAL FIELD

Example embodiments relate to technology for receiving a video, and more particularly, to an apparatus and method for compensating for a received analog video signal.

RELATED ART

Among video transmission methods, a method of using a closed circuit may transmit a video signal through a cable. In the case of transmitting the video signal using the cable, attenuation of the video signal may occur due to the cable. The attenuation of the video signal by the cable may vary based on a type of the cable or a length of the cable. When the video signal is attenuated, or in the case of restoring a video, the video may be degraded.

Korean Patent Laid-Open Publication No. 10-2006-0108422, published on Oct. 18, 2006, discloses the invention relating to an analog signal compensation apparatus and method of a display device capable of displaying a normal video signal regardless of a cable state input from an outside. The above invention provides an analog signal compensation apparatus of a display device that includes a pulse signal transmitter configured to transmit a pulse signal to a cable input terminal of a video device into which a video signal is input and to detect a level of the transmitted pulse signal, and a pulse signal receiver configured to transmit, to a display, as new setting value that is corrected by comparing the level detected at the pulse signal transmitter to a level of an initial pulse signal.

DETAILED DESCRIPTION

Technical Subject

Example embodiments provide a video signal reception apparatus and method.

Example embodiments also provide a video signal compensation method.

Solution

According to an aspect, there is provided a video signal reception method including receiving an analog video signal through a cable, converting the analog video signal to a digital video signal, detecting an equalizing pattern signal indicated in at least one of a luminance signal and a color difference signal of the digital video signal, determining a distortion level of the analog video signal based on the equalizing pattern signal, and compensating for the analog video signal based on the distortion level.

The video signal reception method may further include separating the digital video signal into the luminance signal and the color difference signal.

The separating may include detecting a synchronization (sync) signal of the digital video signal, correcting a direct current (DC) level of the digital video signal based on the sync signal, and separating the corrected digital video signal into the luminance signal and the color difference signal.

The compensating for the analog video signal may include determining a filter to be applied to the analog video signal based on the distortion level, and compensating for the analog video signal by applying the filter to the analog video signal.

The determining of the filter may include determining the filter corresponding to the distortion level among a plurality of filters.

The determining of the filter may include determining the filter based on at least one of a distortion level of the equalizing pattern signal of the luminance signal and a distortion, level of the equalizing pattern signal of the color difference signal.

The equalizing pattern signal may be indicated in a preset section within a vertical blanking interval (VBI) of the analog video signal.

The preset section may be negotiated in advance with an apparatus that transmits the analog video signal.

The determining of the distortion level of the analog video signal may include determining the distortion level by comparing the equalizing pattern signal to preset levels.

The determining of the distortion level of the analog video signal may include detecting a slope of the equalizing pattern signal of the luminance signal, and determining the distortion level corresponding to the slope The determining of the distortion level of the analog video signal may include detecting an amplitude with respect to at least one color of the equalizing pattern signal of the color difference signal, and determining the distortion level based on the amplitude.

The determining of the distortion level of the analog video signal may further include accumulating and averaging the detected amplitude.

The determining of the distortion level of the analog video signal may include correcting a DC level of the digital video signal based on the equalizing pattern signal of the luminance signal, and determining the distortion level of the analog video signal based on the corrected digital video signal.

The equalizing pattern signal may be a composite signal.

The video signal reception method may further include monitoring a reception of the analog video signal, and initializing compensation of the analog video signal in response to a result of the monitoring that satisfies an initialization condition.

According to another aspect, there is provided a video signal reception apparatus including a communicator configured to receive an analog video signal through a cable, a converter configured to convert the analog video signal to a digital video signal, a detector configured to detect an equalizing pattern signal indicated in at least one of a luminance signal and a color difference signal of the digital video signal, a determiner configured to determine a distortion level of the analog video signal based on the equalizing pattern signal, and a compensator configured to compensate for the analog video signal based on the distortion level.

The video signal reception apparatus may further include a separator configured to separate the digital video signal into the luminance signal and the color difference signal.

The compensator may be further configured to determine a filter to be applied to the analog video signal based on the distortion level, and to compensate for the analog video signal by applying the filter to the analog video signal.

The equalizing pattern signal may be indicated in a preset section within a VBI of the analog video signal.

The equalizing pattern signal may be a composite signal.

According to still another aspect, there is provided a video signal compensation method including converting, an analog video signal to a digital video signal, detecting an equalizing pattern signal indicated in a specific section of the digital video signal, determining a distortion level corresponding to the equalizing pattern signal, determining a filter corresponding to the distortion level, and compensating for a distortion of the analog video signal by applying the filter to the analog video signal.

According to still another aspect, there is provided a video signal compensation apparatus including a converter configured to convert an analog video signal to a digital video signal, a detector configured to detect an equalizing pattern signal indicated in a specific section of the digital video signal, a determiner configured to determine a distortion level corresponding to the equalizing pattern signal, and to determine a filter corresponding to the distortion level, and a compensator configured to compensate for a distortion of the analog video signal by applying the filter to the analog video signal.

Effect

According to example embodiments, there may be provided an apparatus and method for compensating for a received analog video signal.

Also, according to example embodiments, there may be provided an apparatus and method for compensating for a distortion of a received analog video signal by applying a filter to the analog video signal based on a distortion level of the analog video signal.

BRIEF DESCRIPTION OF DRAWINGS

FIG. 11 is a flowchart illustrating another example of a method of determining a distortion level of an analog video signal according to example embodiments;

FIG. 12 illustrates an example of a reference color difference signal according to example embodiments;

FIG. 17 is a flowchart illustrating another example of a video reception method according to example embodiments; and FIG. 18 is a block diagram illustrating an example of a video reception apparatus according to example embodiments.

MODE

Figure 1:
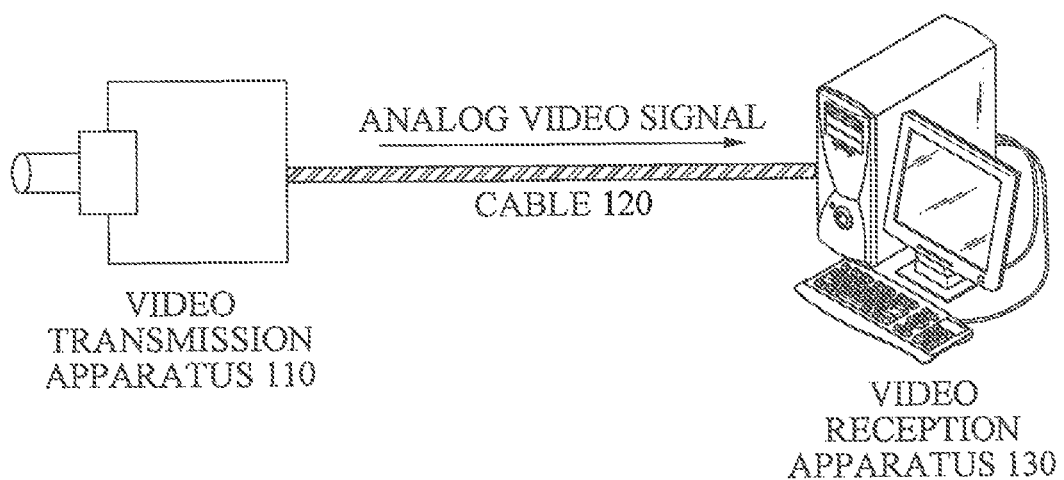
FIG. 1 illustrates an example of a closed-circuit television (CCTV) system according to example embodiments.

Hereinafter, some example embodiments will be described in detail with reference to the accompanying drawings. Like reference numerals in the drawings refer to like elements throughout the present specification.

Various modifications may be made to the example embodiments. However, it should be understood that these embodiments are not construed as limited to the illustrated forms and include all changes, equivalents or alternatives within the idea and the technical scope of this disclosure.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprise/include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which these example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 illustrates an example of a closed-circuit television (CCTV) system according to example embodiments.

Referring to FIG. 1, the CCTV system may include a video transmission apparatus 110 and a video reception apparatus 130.

The video transmission apparatus 110 may photograph a video using a camera. The video transmission apparatus 110 may transmit a photographed video signal to the video reception apparatus 130. A format of the video signal to be transmitted may use an analog method. For example, the video transmission apparatus 110 may convert a digital video signal to an analog video signal, and may transmit the converted analog video signal to the video reception apparatus 130.

According to an aspect, the video transmission apparatus 110 may transmit the analog video signal to the analog reception apparatus 130 through a cable 120. For example, the cable 120 may be a coaxial cable.

In the case of transmitting the analog video signal through the cable 120, the analog video signal may be distorted due to the effect of noise and the cable 120.

The video reception apparatus 130 may detect a distortion level from the received analog video signal. The video reception apparatus 130 may compensate for the analog video signal based on the detected distortion level. For example, the video reception apparatus 130 may detect distortion information based on an equalizing pattern signal indicated in the analog video signal.

A method of compensating for a video signal using an equalizing pattern signal will be described with reference to FIGS. 2 through 18.

Figure 2:
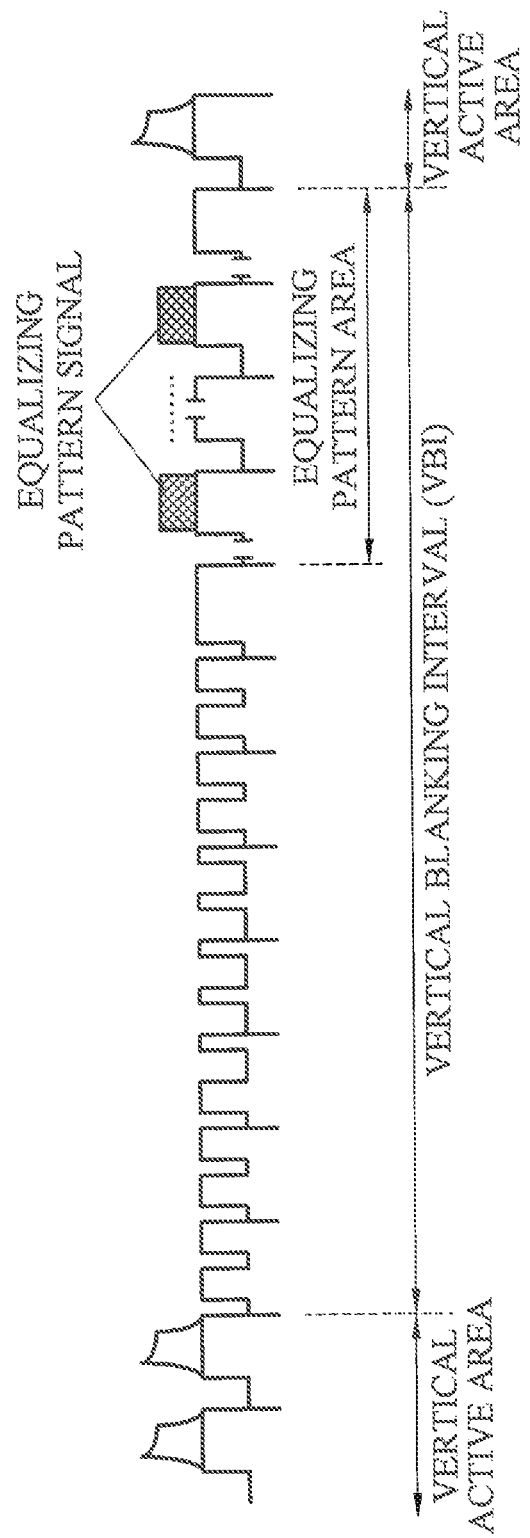
FIG. 2 illustrates an example of an analog video signal according to example embodiments.

FIG. 2 illustrates an example of an analog video signal according to example embodiments.

According to an aspect, the video transmission apparatus 110 may indicate an equalizing pattern signal in the analog video signal. For example, the equalizing pattern signal may be indicated in a preset section within a vertical blanking interval (VBI) of the analog video signal. The preset section may be negotiated in advance between the video transmission apparatus 110 and the video reception apparatus 130.

For example, a plurality of identical equalizing pattern signals may be indicated in the preset section.

The equalizing pattern signal will be described with reference to FIGS. 5 and 6.

Figure 3:
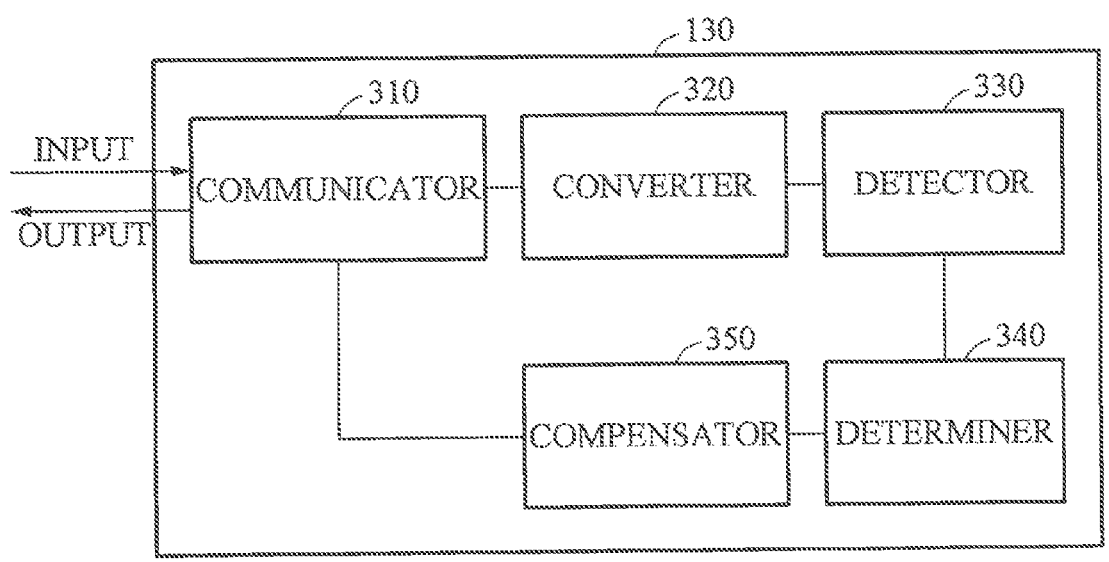
FIG. 3 is a block diagram illustrating an example of a video reception apparatus according to example embodiments.

FIG. 3 is a block diagram illustrating an example of a video reception apparatus according to example embodiments.

Referring to FIG. 3, according to an aspect, the video reception apparatus 130 may include a communicator 310, a converter 320, a detector 330, a determiner 340, and a compensator 350.

According to another aspect, the video reception apparatus 130 may include at least one processor, and the communicator 310, the converter 320, the detector 330, the determiner 340, and the compensator 350 may be controlled through the at least one processor.

The communicator 310, the converter 320, the detector 330, the determiner 340, and the compensator 350 will be described with reference to FIGS. 4 through 17.

Figure 4:
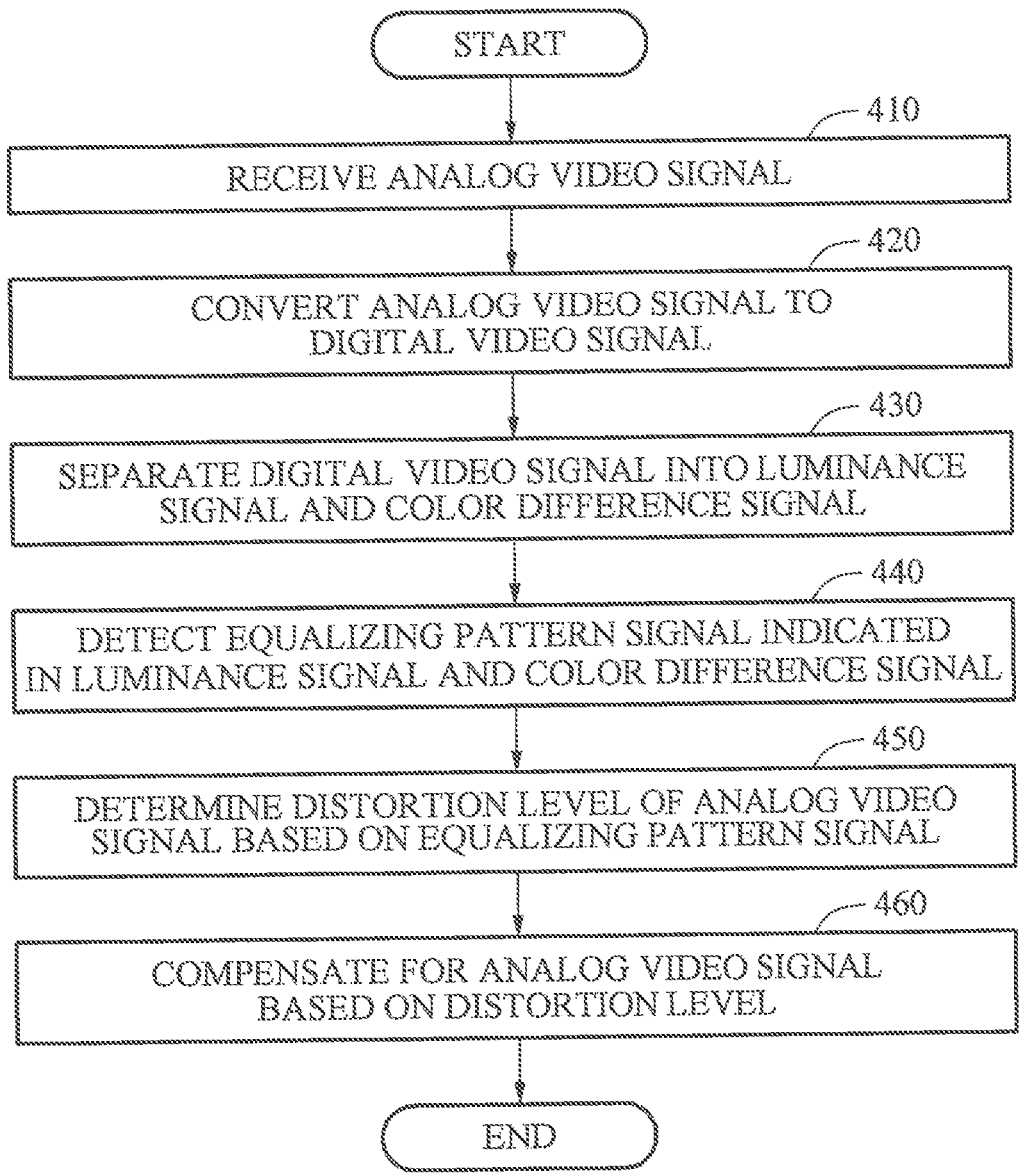
FIG. 4 is a flowchart illustrating an example of a video reception method according to example embodiments.

FIG. 4 is a flowchart illustrating an example of a video reception method according to example embodiments.

Referring to FIG. 4, in operation 410, the communicator 310 may receive an analog video signal from the video transmission apparatus 110. For example, the communicator 310 may receive the analog video signal through the cable 120 connected to the video transmission apparatus 110.

In operation 420, the converter 320 may convert the analog video signal to a digital video signal. For example, the converter 320 may convert the analog video signal to the digital video signal by quantizing the analog video signal.

In operation 430, the detector 330 may separate the digital video signal into a luminance signal and a color difference signal. Operation 430 will be described with reference to FIGS. 6 and 7.

In operation 440, the detector 330 may detect an equalizing pattern signal indicated in at least one of the luminance signal and the color difference signal of the digital video signal. For example, the detector 330 may detect the equalizing pattern signal indicated in the luminance signal or the color difference signal. As another example, the detector 330 may detect the equalizing pattern signal indicated in each of the luminance signal and the color difference signal.

The detected equalizing pattern signal will be described with reference to FIG. 5.

In operation 450, the determiner 340 may determine a distortion level of the analog video signal based on the equalizing pattern signal. For example, the determiner 340 may determine the distortion level by comparing the detected equalizing pattern signal to preset levels.

A method of determining the distortion level will be described with reference to FIGS. 8 through 14.

In operation 460, the compensator 350 may compensate for the analog video signal based on the distortion level.

According to an aspect, the compensator 350 may select a filter corresponding to the distortion level. The compensator 350 may compensate for the analog video signal by applying the filter to the received analog video signal.

A method of compensating for the analog video signal will be described with reference to FIG. 15.

Figure 5:
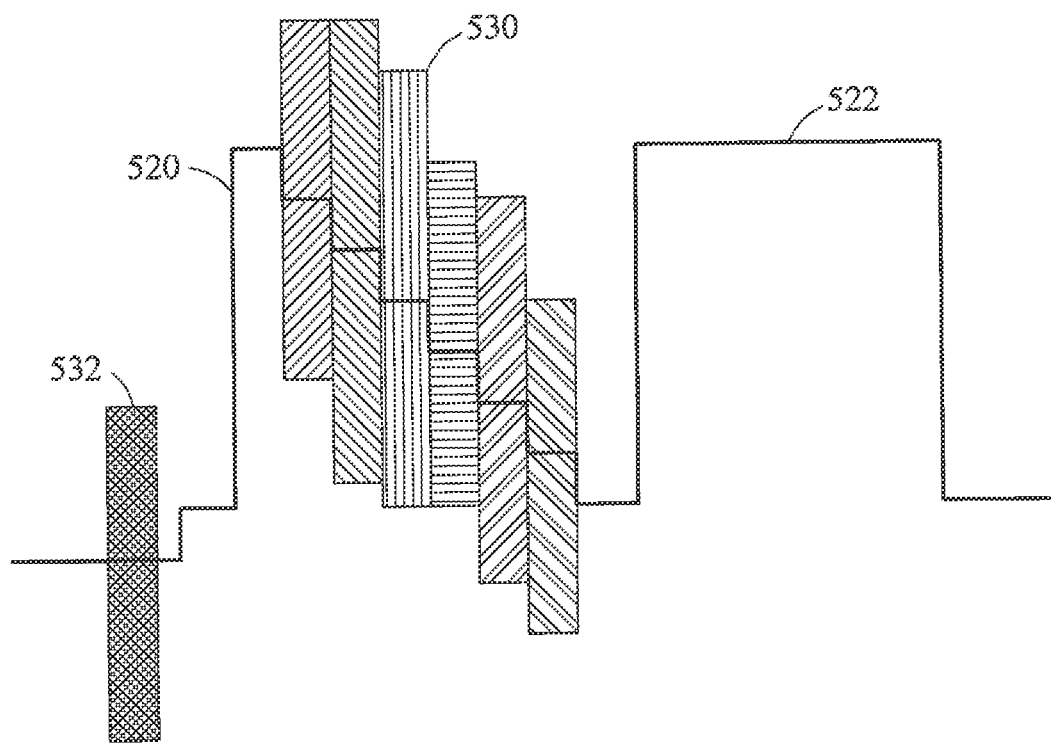
FIG. 5 illustrates an example of an equalizing pattern signal according to example embodiments.

FIG. 5 illustrates an example of an equalizing pattern signal according to example embodiments.

Referring to FIG. 5, an equalizing pattern signal 510 may include an equalizing pattern signal of a luminance signal including, for example, a first luminance signal 520 and a second luminance signal 522 and an equalizing pattern signal 530 of a color difference signal. For example, the equalizing pattern signal 510 may be a composite signal.

The equalizing pattern signal of the luminance signal may include the first luminance signal 520 and the second luminance signal 522. The first luminance signal 520 may indicate a level of the luminance signal. The second luminance signal 522 may indicate a reference value of the luminance signal.

A burst scale signal 532 may indicate an amplitude of a burst signal.

Figure 6:
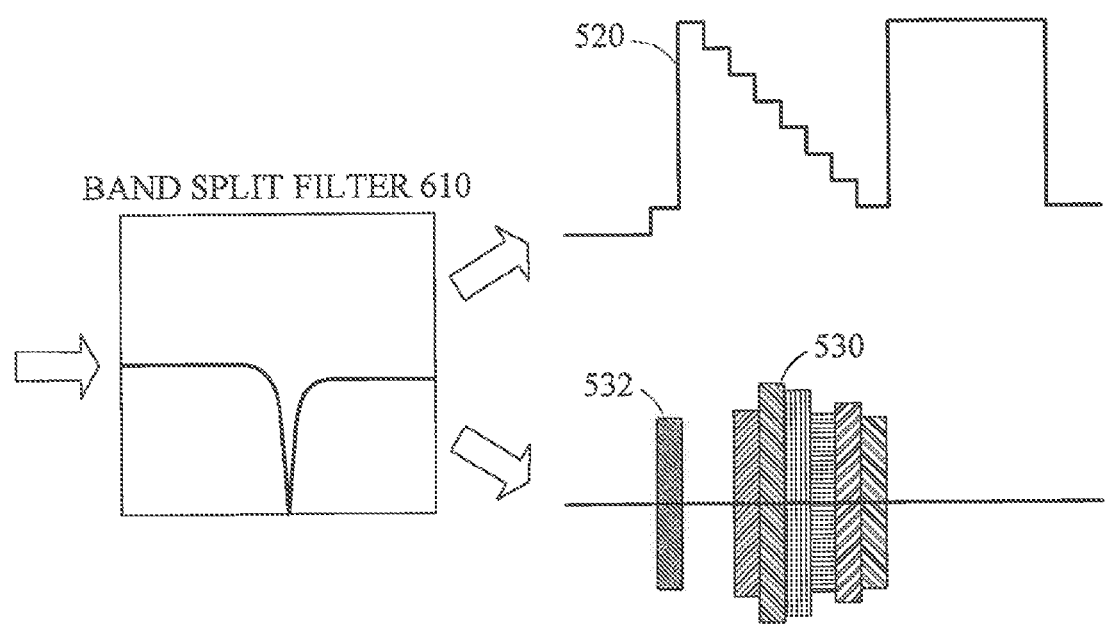
FIG. 6 illustrates an example of separating a digital video signal into a luminance signal and a color difference signal according to example embodiments.

FIG. 6 illustrates an example of separating a digital video signal into a luminance signal and a color difference signal according to example embodiments.

The detector 330 may separate the digital video signal into the luminance signal and the color difference signal using a band split filter (BSF). In this case, the equalizing pattern signal 510 may be separated into the equalizing pattern signal of the luminance signal including, for example, the first luminance signal 520 and the second luminance signal 522 and the equalizing pattern signal 530 of the color difference signal.

The separated equalizing pattern signal of the luminance signal including, for example, the first luminance signal 520 and the second luminance signal 522 and equalizing pattern signal 530 of the color difference signal may be used to determine a distortion level of the analog video signal. For example, the distortion level may be determined based on at least one of an amplitude and a slope of the equalizing pattern signal of the luminance signal including, for example, the first luminance signal 520 and the second luminance signal 522. As another example, the distortion level may be determined based on an amplitude of the equalizing pattern signal 530 of the color difference signal.

Figure 7:
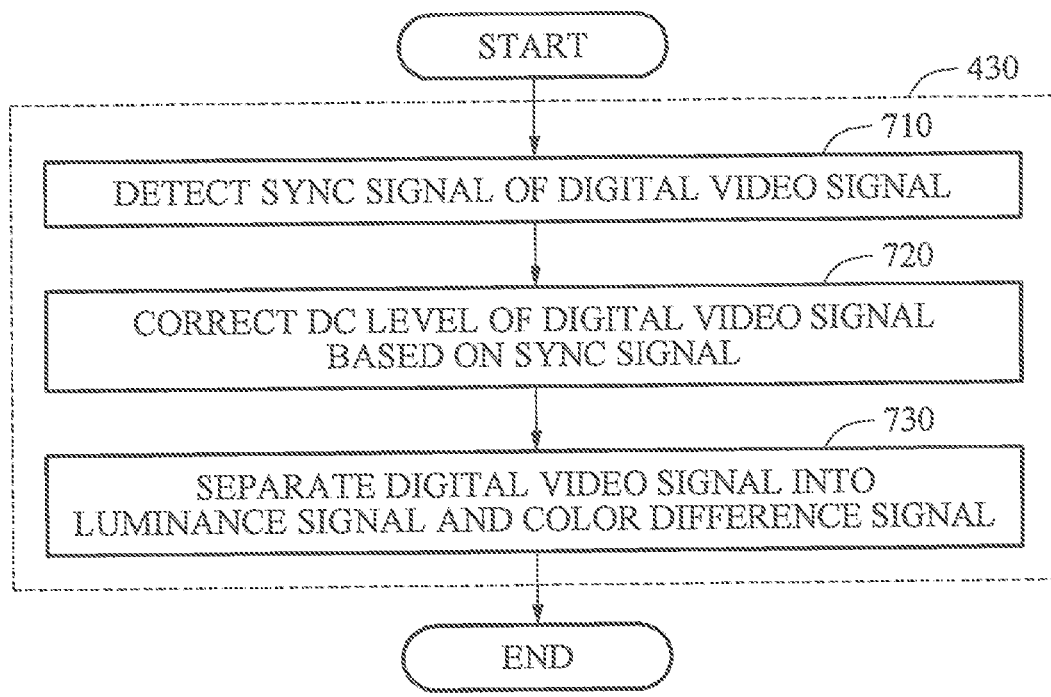
FIG. 7 is a flowchart illustrating an example of a method of separating a digital video signal into a luminance signal and a color difference signal according to example embodiments.

FIG. 7 is a flowchart illustrating an example of a method of separating a digital video signal into a luminance signal and a color difference signal according to example embodiments.

Operation 430 of FIG. 4 may include operations 710 through 730.

In operation 710, the detector 330 may detect a synchronization (sync) signal of the digital video signal.

In operation 720, the detector 330 may correct a direct current (DC) level of the digital video signal based on the detected sync signal. For example, when the detected sync signal is less than a preset value, the detector 330 may correct the sync signal based on the preset value. The detector 330 may correct the DC level of the digital video signal by the corrected level of the sync signal.

According to an aspect, operation 720 may be selectively performed.

In operation 730, the detector 330 may separate the corrected digital video signal into the luminance signal and the color difference signal. Here the equalizing pattern signal may be separated into the equalizing pattern signal of the luminance signal and the equalizing pattern signal of the color difference signal.

Figure 8:
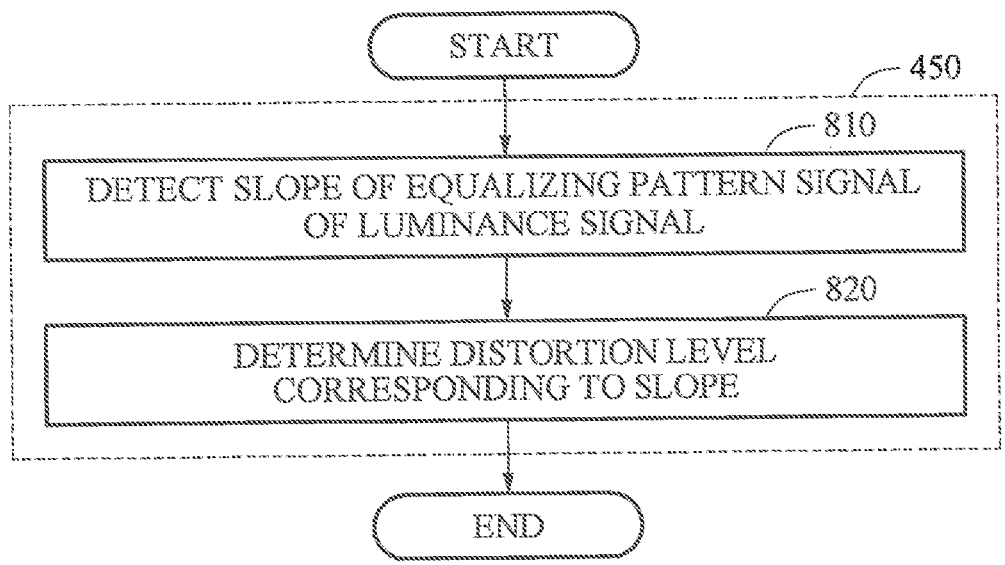
FIG. 8 is a flowchart illustrating an example of a method of determining a distortion level of an analog video signal according to example embodiments.

FIG. 8 is a flowchart illustrating an example of a method of determining a distortion level of an analog video signal according to example embodiments.

Operation 450 of FIG. 4 may include operations 810 and 820.

In operation 810, the determiner 340 may detect the slope of the equalizing pattern signal of the luminance signal. A method of detecting the slope of the equalizing pattern signal of the luminance signal will be described with reference to FIG. 10.

In operation 820, the determiner 340 may determine a distortion level corresponding to the detected slope. For example, a corresponding distortion level may be mapped to a section of a slope value. For example, a section of 85 degrees to 90 degrees may correspond to a first distortion level, and a section of 80 degrees to 85 degrees may correspond to a second distortion level.

Figure 9:
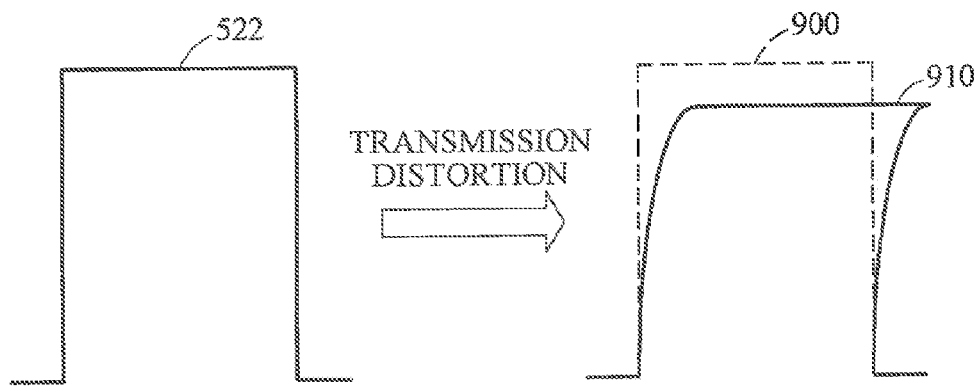
FIG. 9 illustrates an example of a distorted equalizing pattern signal of a luminance signal according to example embodiments.

FIG. 9 illustrates an example of a distorted equalizing pattern signal of a luminance signal according to example embodiments.

Referring to FIG. 9, an equalizing pattern signal of a luminance signal corresponding to the second luminance signal 522 of FIG. 5 may be a distortion-free equalizing pattern signal. The equalizing pattern signal of the luminance signal corresponding to the second luminance signal 522 may be distorted when the equalizing pattern signal of the luminance signal corresponding to the second luminance signal 522 is transmitted through the cable 120.

A distorted equalizing pattern signal 910 of a luminance signal may have a relatively reduced amplitude or a varying slope compared to an equalizing pattern signal 900 of an original luminance signal.

Figure 10:
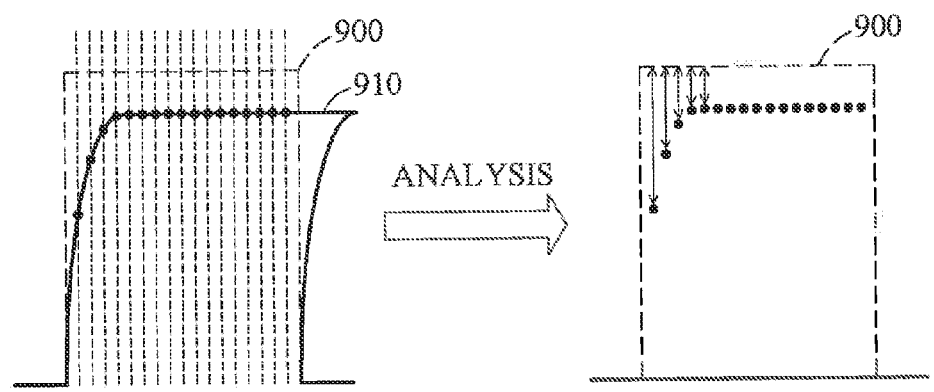
FIG. 10 illustrates an example of detecting a slope of a distorted equalizing pattern signal of a luminance signal according to example embodiments.

FIG. 10 illustrates an example of detecting a slope of a distorted equalizing pattern signal of a luminance signal according to example embodiments.

The determiner 340 may sample the distorted equalizing pattern signal of the luminance signal using a sampling clock.

The determiner 340 may detect a slope of the distorted equalizing pattern signal of the luminance signal based on a value of the sampled distorted equalizing pattern signal of the luminance signal and a value of the equalizing pattern signal 900 of the original luminance signal.

FIGS. 8 through 10 illustrate examples of a method of determining a distortion level of an analog video signal based on an equalizing pattern signal of a luminance signal. A method of determining the distortion level of the analog video signal based on an equalizing pattern signal of a color difference signal will be described with reference to FIG. 11.

FIG. 11 is a flowchart illustrating another example of a method of determining a distortion level of an analog video signal according to example embodiments.

Operation 450 of FIG. 4 may include operations 1110 through 1130.

In operation 1110, the determiner 340 may detect an amplitude with respect to at least one color of the equalizing pattern signal of the color difference signal. For example, the determiner 340 may detect the amplitude with respect to at least one color using the equalizing pattern signal 530 of the color difference signal of FIG. 5.

In operation 1120, the determiner 340 may accumulate and average the detected amplitude.

According to an aspect, operation 1120 may be selectively performed.

In operation 1130, the determiner 340 may determine the distortion level of the analog video signal based on the detected amplitude with respect to at least one color.

For example, the determiner 340 may determine the distortion level of the analog video signal by comparing a reference color difference signal to the detected amplitude with respect to at least one color. The reference color difference signal will be described with reference to FIG. 12.

As another example, a corresponding distortion level may be mapped to a section of a preset value. For example, a first distortion level may correspond to a first amplitude section and a second distortion level may correspond to a second amplitude section.

Although operations 810 and 820 of FIG. 8 and operations 1110 through 1130 of FIG. 11 are described in the separate drawings, the determiner 340 may perform operations 810 and 820 and operations 1110 through 1130 in parallel in operation 450.

In operation 450, the determiner 340 may determine a final distortion level of the analog video signal by considering all of the distortion level determined corresponding to the slope and the distortion level determined based on the amplitude. For example, the determiner 340 may determine the final distortion level of the analog video signal by applying a weight to each of the distortion level determined corresponding to the slope and the distortion level determined based on the amplitude.

FIG. 12 illustrates an example of a reference color difference signal according to example embodiments.

A reference color difference signal 1210 may have a minimum value and a maximum value with respect to each area or color. For example, a minimum value and a maximum value with respect to each area may be represented as Table 1. Additionally, a burst signal value is disclosed in Table 1.

TABLE 1

| Area | Minimum value | Maximum value | Range |
|---|---|---|---|
| A | −20 | 20 | 40 |
| B | 37.9 | 100 | 62.1 |
| C | 12.3 | 100 | 87.7 |
| D | 7.3 | 89.2 | 81.9 |

TABLE 1-continued

| Area | Minimum value | Maximum value | Range |
|---|---|---|---|
| E | −4.8 | 77.1 | 81.9 |
| F | −15.6 | 72.1 | 87.7 |
| G | −15.6 | 56.4 | 62 |

Figure 13:
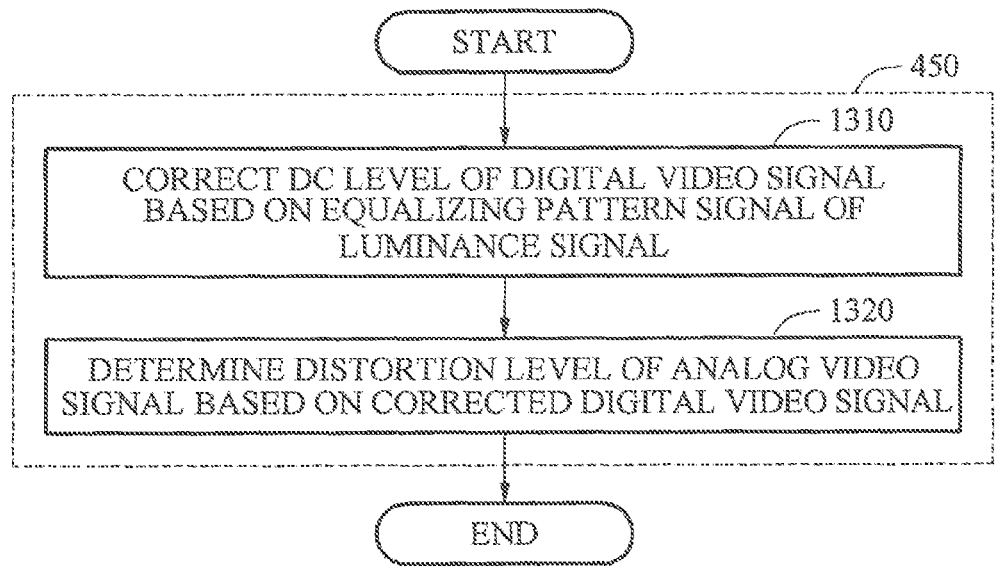
FIG. 13 is a flowchart illustrating still another example of a method of determining a distortion level of an analog video signal according to example embodiments.

FIG. 13 is a flowchart illustrating still another example of a method of determining a distortion level of an analog video signal according to example embodiments.

Operation 450 of FIG. 4 may include operations 1310 and 1320.

In operation 1310, the determiner 340 may correct a DC level of the digital video signal based on the equalizing pattern signal of the luminance signal. For example, the determiner 340 may correct the DC level of the digital video signal using a reference luminance signal.

The reference luminance signal will be described with reference to FIG. 14.

In operation 1320, the determiner 340 may determine a DC level of the analog video signal based on the corrected digital video signal.

Figure 14:
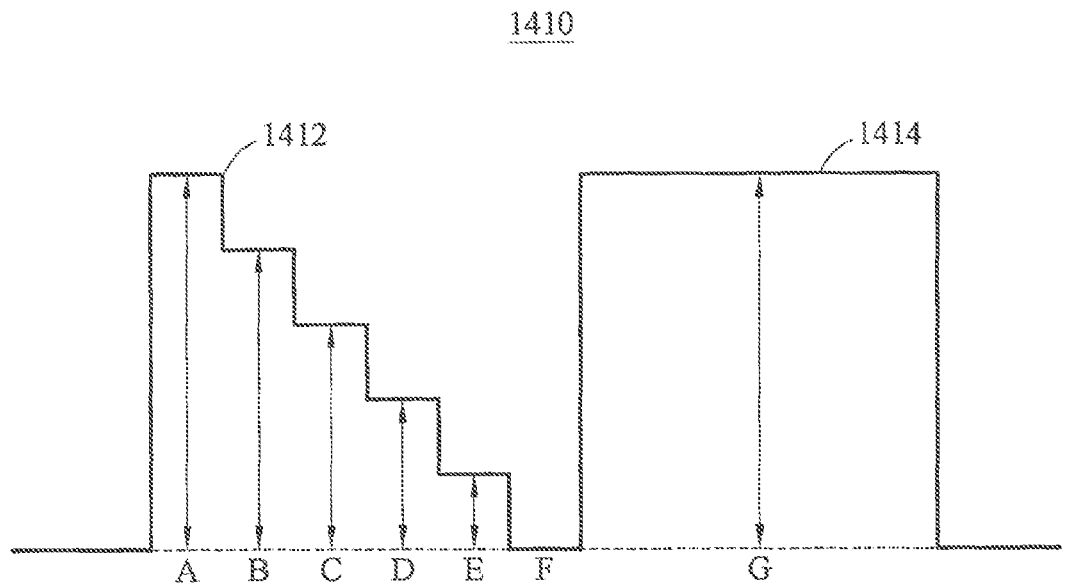
FIG. 14 illustrates an example of a reference luminance signal according to example embodiments.

FIG. 14 illustrates an example of a reference luminance signal according to example embodiments.

Referring to FIG. 14, a reference luminance signal 1410 may include a first reference luminance signal 1412 and a second reference luminance signal 1414.

Each of the first reference luminance signal 1412 and the second reference luminance signal 1414 may have a reference value or an amplitude preset with respect to each area.

For example, the preset amplitude may be represented as Table 2.

TABLE 2

| Area | Reference value |
|---|---|
| A | 100 |
| B | 80 |
| C | 60 |
| D | 40 |
| E | 20 |
| F | 0 |
| G | 100 |

The determiner 340 may compare the equalizing pattern signal of the luminance signal to the reference luminance signal 1410. The determiner 340 may correct the DC level of the digital video signal based on the comparison result.

Figure 15:
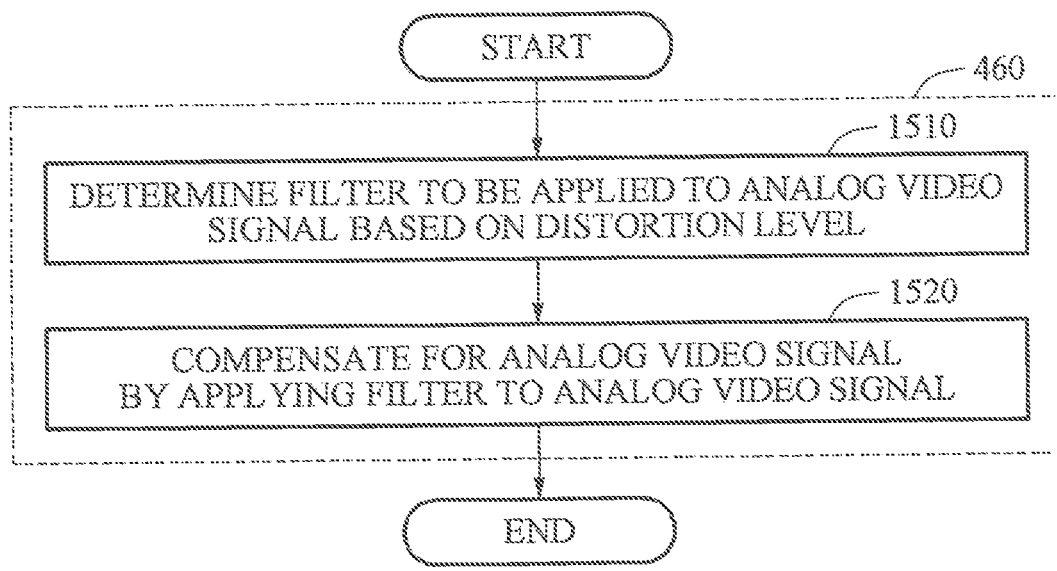
FIG. 15 is a flowchart illustrating an example of a method of compensating for an analog video signal according to example embodiments.

FIG. 15 is a flowchart illustrating a method of compensating for an analog video signal according to example embodiments.

Operation 460 of FIG. 4 may include operations 1510 and 1520.

In operation 1510, the compensator 350 may determine a filter to be applied to the analog video signal based on the distortion level.

For example, the compensator 350 may determine a filter corresponding to the distortion level among a plurality of pre-stored filters.

As another example, the compensator 350 may determine the filter based on at least one of a distortion level with respect to the equalizing pattern signal of the luminance signal and a distortion level with respect to the equalizing pattern signal of the color difference signal.

In operation 1520, the compensator 350 may compensate for the analog video signal by applying the determined filter to the received analog video signal.

Figure 16:
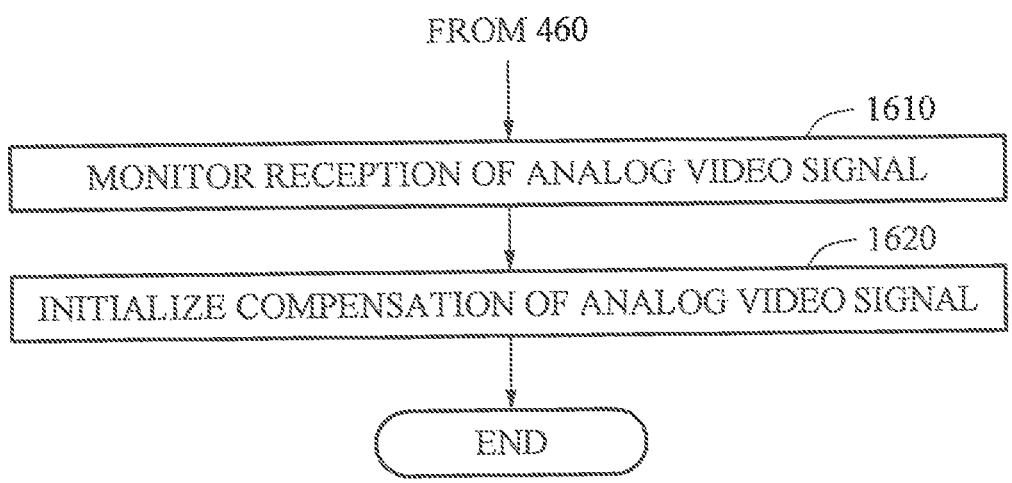
FIG. 16 is a flowchart illustrating an example of a compensation initialization method according to example embodiments.

FIG. 16 is a flowchart illustrating an example of a compensation initialization method according to example embodiments.

Operation 1610 may be performed after operation 460.

In operation 1610, the communicator 310 may monitor a reception of the analog video signal.

According to an aspect, the communicator 310 may determine whether a result of monitoring satisfies an initialization condition. For example, a case in which the initialization condition is satisfied may correspond to a case in which the analog video signal is not received. As another example, a case in which the initialization condition is satisfied may correspond to a case in which the video reception apparatus 130 is powered off.

In operation 1620, the compensator 350 may initialize the compensation of the analog video signal in response to the result of monitoring that satisfies the initialization condition. For example, the compensator 350 may initialize the filter to be applied to the analog video signal.

On the contrary, when the result of monitoring does not satisfy the initialization condition, the compensator 350 may maintain the filter to be applied to the analog video signal.

FIG. 17 is a flowchart illustrating another example of a video reception method according to example embodiments.

In operation 1710, the converter 320 may convert an analog video signal to a digital video signal.

In operation 1720, the detector 330 may detect an equalizing pattern signal indicated in a specific section of the digital video signal.

In operation 1730, the determiner 340 may determine a distortion level corresponding to the equalizing pattern signal.

In operation 1740, the determiner 340 may determine a filter corresponding to the distortion level.

In operation 1750, the compensator 350 may compensate for distortion of the analog video signal by applying the filter to the analog video signal.

Description relating to operations 1710 through 1750 may refer to the description made above with reference to FIGS. 4 through 16.

FIG. 18 is a block diagram illustrating an example of a video reception apparatus according to example embodiments.

According to an aspect, the video reception apparatus 130 may include an equalizing filter group 1810, an analog-to-digital converter (ADC) 1820, a pre-processor 1830, an equalizing pattern signal analyzer 1840, and a post-processor 1850.

The equalizing filter group 1810 may receive an analog video signal from the video transmission apparatus 110. The equalizing filter group 1810 may determine a filter to be applied to the analog video signal based on an analysis result of the equalizing pattern signal analyzer 1840.

Description relating to the ADC 1820 may refer to the description relating to the converter 320.

The pre-processor 1830 may receive a digital video signal converted from the ADC 1820. The pre-processor 1830 may detect a sync of the digital video signal. The pre-processor 1830 may perform a DC level and gain correction with respect to the digital video signal.

The pre-processor 1830 may separate the digital video signal into a luminance signal and a color difference signal.

The equalizing pattern signal analyzer 1840 may detect at least one of an equalizing pattern signal of the luminance signal and an equalizing pattern signal of the color difference signal. The equalizing pattern signal analyzer 1840 may transmit information about the filter to be applied to the analog video signal to the equalizing filter group 1810 based on at least one of the equalizing pattern signal of the luminance signal and the equalizing pattern signal of the color difference signal.

The post-processor 1850 may encode the digital video signal in a digital interface format that may be output on a display.

The units and/or modules described herein may be implemented using hardware components, software components, and/or combination of the hardware components and the software components. For example, the apparatuses and the hardware components described herein may be implemented using, for example, a processor, a controller and an arithmetic logic unit (ALU), a digital signal processor, a microcomputer, a field programmable array (FPA), a programmable logic unit (PLU), a microprocessor, or one or more general-purpose computers or specific-purpose computers such as any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such a parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, and DVDs; magneto-optical media such as optical media and floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described hardware devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture device, or circuit are combined in a different manner and/or replaced or supplemented by other components or their equivalents. Accordingly, other implementations are within the scope of the following claims.

What is claimed is:

1. A video signal reception method comprising:
receiving an analog video signal through a cable;
converting the analog video signal to a digital video signal;
separating the digital video signal into the luminance signal and the color difference signal;
detecting an equalizing pattern signal indicated in at least one of the luminance signal and the color difference signal of the digital video signal;
determining a distortion level of the analog video signal based on the equalizing pattern signal; and
compensating for the analog video signal based on the distortion level,
wherein the separating comprises:
detecting a synchronization (sync) signal of the digital video signal;
correcting a direct current (DC) level of the digital video signal based on the sync signal; and
separating the corrected digital video signal into the luminance signal and the color difference signal;
wherein the compensating for the analog video signal comprises: determining a filter to be applied to the analog video signal based on the distortion level; and compensating for the analog video signal by applying the filter to the analog video signal; and
wherein the determining of the distortion level of the analog video signal comprises determining the distortion level by comparing the equalizing pattern signal to preset levels.

2. The video signal reception method of claim 1, wherein the determining of the filter comprises determining the filter corresponding to the distortion level among a plurality of filters.

3. The video signal reception method of claim 1, wherein the determining of the filter comprises determining the filter based on at least one of a distortion level of the equalizing pattern signal of the luminance signal and a distortion level of the equalizing pattern signal of the color difference signal.

4. The video signal reception method of claim 1, wherein the equalizing pattern signal is indicated in a preset section within a vertical blanking interval (VBI) of the analog video signal.

5. The video signal reception method of claim 4, wherein the preset section is negotiated in advance with an apparatus that transmits the analog video signal.

6. The video signal reception method of claim 1, wherein the determining of the distortion level of the analog video signal comprises:
detecting a slope of the equalizing pattern signal of the luminance signal; and
determining the distortion level corresponding to the slope.

7. The video signal reception method of claim 1, wherein the determining of the distortion level of the analog video signal comprises:
detecting an amplitude with respect to at least one color of the equalizing pattern signal of the color difference signal; and
determining the distortion level based on the amplitude.

8. The video signal reception method of claim 7, wherein the determining of the distortion level of the analog video signal further comprises accumulating and averaging the detected amplitude.

9. The video signal reception method of claim 1, wherein the determining of the distortion level of the analog video signal comprises:

correcting a DC level of the digital video signal based on the equalizing pattern signal of the luminance signal; and determining the distortion level of the analog video signal based on the corrected digital video signal.

10. The video signal reception method of claim 1, wherein the equalizing pattern signal is a composite signal.

11. The video signal reception method of claim 1, further comprising:

monitoring a reception of the analog video signal; and initializing compensation of the analog video signal in response to a result of the monitoring that satisfies an initialization condition.

12. A video signal reception apparatus comprising:

a communicator configured to receive an analog video signal through a cable;

a converter configured to convert the analog video signal to a digital video signal;

a separator configured to separate the digital video signal into the luminance signal and the color difference signal;

a detector configured to detect an equalizing pattern signal indicated in at least one of the luminance signal and the color difference signal of the digital video signal;

a determiner configured to determine a distortion level of the analog video signal based on the equalizing pattern signal; and a compensator configured to compensate for the analog video signal based on the distortion level wherein the separator configured to detect a synchronization (sync) signal of the digital video signal, correct a direct current (DC) level of the digital video signal based on the sync signal, and separate the corrected digital video signal into the luminance signal and the color difference signal; wherein the compensator is further configured to determine a filter to be applied to the analog video signal based on the distortion level, and to compensate for the analog video signal by applying the filter to the analog video signal; and wherein the determiner is further configured to determine the distortion level of the analog video signal by comparing the equalizing pattern signal to preset levels.

13. The video signal reception apparatus of claim 12, wherein the equalizing pattern signal is indicated in a preset section within a vertical blanking interval (VBI) of the analog video signal.

14. The video signal reception apparatus of claim 12, wherein the equalizing pattern signal is a composite signal.

15. A video signal compensation method comprising:

converting an analog video signal to a digital video signal;

separating the digital video signal into the luminance signal and the color difference signal;

detecting an equalizing pattern signal indicated in at least one of the luminance signal and the color difference signal of the digital video signal;

determining a distortion level of the analog video signal corresponding to the equalizing pattern signal;

determining a filter corresponding to the distortion level; and compensating for a distortion of the analog video signal by applying the filter to the analog video signal, wherein the separating comprises:

detecting a synchronization (sync) signal of the digital video signal;

correcting a direct current (DC) level of the digital video signal based on the sync signal; and separating the corrected digital video signal into the luminance signal and the color difference signal; and wherein the determining of the distortion level of the analog video signal comprises determining the distortion level by comparing the equalizing pattern signal to preset levels.

* * * * *